United States Patent
Kang et al.

(10) Patent No.: US 10,620,336 B2
(45) Date of Patent: Apr. 14, 2020

(54) METHOD, DEVICE AND SYSTEM FOR INSPECTING MOVING OBJECT BASED ON COSMIC RAYS

(71) Applicants: TSINGHUA UNIVERSITY, Beijing (CN); NUCTECH COMPANY LIMITED, Beijing (CN)

(72) Inventors: Kejun Kang, Beijing (CN); Jianping Cheng, Beijing (CN); Zhiqiang Chen, Beijing (CN); Ziran Zhao, Beijing (CN); Junli Li, Beijing (CN); Xuewu Wang, Beijing (CN); Zhi Zeng, Beijing (CN); Qingjun Zhang, Beijing (CN); Jianping Gu, Beijing (CN); Xi Yi, Beijing (CN); Bicheng Liu, Beijing (CN); Guangming Xu, Beijing (CN); Yongqiang Wang, Beijing (CN)

(73) Assignees: TSINGHUA UNIVERSITY, Beijing (CN); NUCTECH COMPANY LIMITED, Beijing (CN)

( * ) Notice: Subject to any disclaimer, the term of this patent is extended or adjusted under 35 U.S.C. 154(b) by 57 days.

(21) Appl. No.: 15/411,359

(22) Filed: Jan. 20, 2017

(65) Prior Publication Data
US 2017/0329039 A1    Nov. 16, 2017

(30) Foreign Application Priority Data
Jan. 22, 2016   (CN) .......................... 2016 1 0045068

(51) Int. Cl.
*G01V 5/00*  (2006.01)
*G01T 5/02*  (2006.01)

(52) U.S. Cl.
CPC .............. *G01V 5/0075* (2013.01); *G01T 5/02* (2013.01); *G01V 5/0016* (2013.01); *G01N 2223/205* (2013.01); *G01V 5/0091* (2013.01)

(58) Field of Classification Search
None
See application file for complete search history.

(56) References Cited

U.S. PATENT DOCUMENTS

2005/0156734 A1*  7/2005  Zerwekh ................. G01T 1/167
                                                                 340/539.1
2007/0102648 A1*  5/2007  Shpantzer ............ G01N 21/171
                                                                 250/394

(Continued)

FOREIGN PATENT DOCUMENTS

| CN | 101606083 A | 12/2009 |
|----|-------------|---------|
| CN | 102203637 A | 9/2011 |

(Continued)

OTHER PUBLICATIONS

European Search Report issued in Application No. 17152525.6 dated Jun. 21, 2017.

(Continued)

*Primary Examiner* — James Choi
(74) *Attorney, Agent, or Firm* — Scully Scott Murphy & Presser

(57) ABSTRACT

The present disclosure relates to a method, a device and a system for inspecting a moving object based on cosmic rays, pertaining to the field of radiation imaging and safety inspection techniques. The method includes: detecting whether a speed of the inspected moving object is within a preset range; recording a motion trajectory of the moving object with a monitoring device; acquiring information about charged particles in the cosmic rays with a position sensitive detector, the information about charged particles including track information of the charged particles; determining the moving object by matching positions of the motion trajectory and the track information; reconstructing the track of the charged particles according to the informa- (Continued)

tion about the charged particles; and recognizing the material inside the moving object based on the track reconstruction.

20 Claims, 5 Drawing Sheets

(56) References Cited

U.S. PATENT DOCUMENTS

| | | | |
|---|---|---|---|
| 2008/0315091 | A1 | 12/2008 | Morris et al. |
| 2010/0065745 | A1* | 3/2010 | Goldberg .............. G01T 1/2935 250/358.1 |
| 2014/0332685 | A1* | 11/2014 | Anghel ................ G01N 23/046 250/307 |
| 2015/0219785 | A1* | 8/2015 | Tudor .................. G01V 5/0016 378/57 |

FOREIGN PATENT DOCUMENTS

| | | |
|---|---|---|
| CN | 104502377 A | 4/2015 |
| CN | 104730558 A | 6/2015 |
| CN | 105074440 A | 11/2015 |
| JP | 5789133 B2 | 8/2015 |
| WO | WO 2008/127442 A2 | 10/2008 |

OTHER PUBLICATIONS

Blanpied, G., et al. "Material discrimination using scattering and stopping of cosmic ray muons and electrons: Differentiating heaviest from lighter metals as well as low atomic weight materials" Nuclear Instruments and Methods in Physics Research A, 784:352-358 (2015).

European Search Report issued in European Patent Application No. 17152525.6 dated Nov. 7, 2017.

Shi, S., et al. "Research on Reconstruction Qlgorithim of Cosmic Ray Muon Tomography" Nuclear Electronics & Detection Technology, 34(8):976-980 (2014)—with English abstract.

Tu, C., et al. "Cosmic-ray Muon Imaging for nuclear materials detection" Chinese Journal of Stereology and Image Analysis, 11(4):284-287 (2006)—with English abstract.

\* cited by examiner

METHOD, DEVICE AND SYSTEM FOR INSPECTING MOVING OBJECT BASED ON COSMIC RAYS

CROSS REFERENCE

This application is based upon and claims priority to Chinese Patent Application No. 201610045068.0, filed on Jan. 22, 2016, the entire contents thereof are incorporated herein by reference.

TECHNICAL FIELD

The present disclosure relates to radiation imaging and safety inspection techniques, and more particularly, to a method, a device and a system for inspecting a moving object based on cosmic rays.

BACKGROUND

With the rapid development of nuclear energy and nuclear technology, the technical threshold of nuclear weapons preparation is getting lower and lower. In accordance with the provisions of the International Atomic Energy Agency, when the purity of nuclear bomb raw material such as uranium 235 or plutonium 239 reaches 92-93%, it is referred to as weapon grade, that is, the nuclear bomb raw material may cause nuclear explosion when reaches a certain amount (generally 12-16 kg of uranium, or 6-9 kg of plutonium). The strong destructive power of nuclear weapons not only brings huge economic losses, but also poses more serious threat to human survival and development.

On the other hand, the crime and economic loss caused by the illegal spread of explosives and drugs have brought great harm to individuals, families and the whole society. Especially in recent years, the global security situation is very grim, terrorist organizations, extreme organization activities are rampant, many terrorist attacks have been conducted recently, resulting in a very bad influence, such as the Russian plane crashed in Egypt and the terrorist attacks in Paris, France, which are the horrific consequences of the use of explosives by extremist groups.

Therefore, strict control and management of illegal proliferation of these materials, strengthening of safeguards and physical protection technologies, and the development of related material monitoring and detection technology are highly demanded.

Accordingly, there is a need for a novel method, a device and a system for inspecting a moving object based on cosmic rays The above-described information disclosed in the background section is for the purpose of enhancing the understanding of the context of the present disclosure and thus may include information which does not constitute prior art known to those of ordinary skill in the art.

SUMMARY

The present disclosure provides a method, a device and a system for inspecting a moving object based on cosmic rays, which can improve the efficiency of security inspection.

Other characteristics and advantages of the present disclosure may become apparent from the following detailed description and may partly learned from the practice of the present disclosure.

According to one aspect of the present disclosure, there is provided a method for inspecting a moving object based on cosmic rays, including: detecting whether a speed of the inspected moving object is within a preset range; recording a motion trajectory of the moving object with a monitoring device; acquiring information about charged particles in the cosmic rays with a position sensitive detector, the information about charged particles including track information of the charged particles; determining the moving object by matching positions of the motion trajectory and the track information; reconstructing the track of the charged particles according to the information about the charged particles; and recognizing the material inside the moving object based on the track reconstruction.

According to an embodiment of the present disclosure, the preset range of the speed of the moving object is selected to ensure that at least one charged particle can be detected from per 100 square centimeters of a surface area of the moving object.

According to an embodiment of the present disclosure, the position sensitive detector is configured to have a capability of detecting muons and electrons from the cosmic rays.

According to an embodiment of the present disclosure, the position sensitive detector is configured to have a capability of detecting a material with a medium-to-high atomic number which is higher than the atomic number of aluminum, and a material with a low atomic number which is lower than the atomic number of aluminum. Wherein the material with a low atomic number is recognized based on a blocking effect to electrons; and the material with a medium-to-high atomic number is recognized based on a scattering effect to muons.

According to an embodiment of the present disclosure, the position sensitive detector includes a GEM detector, an MRPC detector, a drift chamber or a drift tube array.

According to an embodiment of the present disclosure, the position sensitive detector is configured as a part of the system for inspecting a moving vehicle, the position sensitive detector is placed in an inspection channel, and a vehicle to be inspected passes through the position sensitive detector.

According to an embodiment of the present disclosure, reconstructing the track of the charged particles according to the information about the charged particles includes: calculating a parameter Ratio of the material according to the track information of the charged particles, estimating an initial value of an atomic number and an initial value of a relative mass of the material, the parameter Ratio denoting a ratio of a scattering parameter of the material on the charged particles against a blocking parameter of the material on the charged particles; calculating a radiation length according to a relationship among the initial value of the atomic number and the initial value of the relative mass and the radiation length; obtaining a thickness of the material according to the radiation length; calculating a blocking parameter and a scattering parameter of the material according to the initial value of the atomic number, the initial value of the relative mass and the thickness of the material; and recognizing the material with the blocking parameter and the scattering parameter. Wherein a material with a low atomic number can be recognized based on a blocking effect to electrons in the charged particles; and a material with a medium-to-high atomic number can be recognized based on a scattering effect to muons in the charged particles.

According to an embodiment of the present disclosure, the method further includes: reconstructing a material distribution map with an imaging algorithm according to a corresponding relationship among the blocking parameter, the scattering parameter and the material property, the imaging algorithm including a PoCA algorithm and/or a MLSD-OSEM algorithm, and/or so forth.

According to an embodiment of the present disclosure, the method further includes: updating information about the material to perform a next iterative process.

According to an embodiment of the present disclosure, the method further includes: categorizing the material of the moving object according to a corresponding relationship among the scattering parameter, the blocking parameter and the material property.

According to an embodiment of the present disclosure, multiple pieces of track information of the charged particles are processed in parallel during the reconstruction of the track.

According to an embodiment of the present disclosure, the track information of the charged particles includes an incident time, an incident position and an incident direction, an emission time, an emission position and an emission direction of the charged particles.

According to an embodiment of the present disclosure, determining the moving object by matching positions of the motion trajectory and the track information includes: analyzing a time difference between the incident time and the emission time; and matching the time and position of the track information of the charged particles and the motion trajectory of the moving object according to the incident position, the emission position and the analyzed time difference.

According to another aspect of the present disclosure, there is provided a device for inspecting a moving object based on cosmic rays, including: a speed detection module configured to detect whether a speed of the inspected moving object is within a preset range; a recording module configured to record a motion trajectory of the inspected moving object with a monitoring device; an acquiring module configured to acquire information about charged particles in the cosmic rays with a position sensitive detector, the information about charged particles including track information of the charged particles; a matching module configured to determine the moving object by matching positions of the motion trajectory and the track information; a reconstruction module configured to reconstruct the track of the charged particles according to the information about the charged particles; and a recognition module configured to recognize the material inside the moving object based on the track reconstruction.

According to an embodiment of the present disclosure, the preset range of the speed of the moving object is selected to ensure that at least one charged particle can be detected from per 100 square centimeters of a surface area of the moving object.

According to an embodiment of the present disclosure, the position sensitive detector is configured to have a capability of detecting muons and electrons from the cosmic rays.

According to an embodiment of the present disclosure, the position sensitive detector is configured to have a capability of detecting a material with a medium-to-high atomic number which is higher than the atomic number of aluminum, and a material with a low atomic number which is lower than the atomic number of aluminum. Wherein the material with a low atomic number is recognized based on a blocking effect to electrons; and the material with a medium-to-high atomic number is recognized based on a scattering effect to muons.

According to an embodiment of the present disclosure, the position sensitive detector includes a GEM detector, an MRPC detector, a drift chamber or a drift tube array.

According to an embodiment of the present disclosure, the position sensitive detector is configured as a part of the system for inspecting a moving vehicle, the position sensitive detector is placed in an inspection channel, and a moving vehicle to be inspected passes through the position sensitive detector.

According to an embodiment of the present disclosure, the reconstruction module includes: an estimation unit configured to calculate a parameter Ratio of the material according to the track information of the charged particles, estimate an initial value of an atomic number and an initial value of a relative mass of the material, the parameter Ratio denoting a ratio of a scattering effect of the material on the charged particles against a blocking effect of the material on the charged particles; a radiation-length calculating unit configured to calculate a radiation length according to a relationship among the initial value of the atomic number and the initial value of the relative mass and the radiation length; a thickness calculating unit configured to obtain a thickness of the material according to the radiation length; a blocking-scattering calculating unit configured to calculate a blocking effect and a scattering effect of the material according to the initial value of the atomic number, the initial value of the relative mass and the thickness of the material; and the material can be recognized with the blocking effect and the scattering effect, wherein a material with a low atomic number can be recognized based on a blocking effect to electrons in the charged particles; and a material with a medium-to-high atomic number can be recognized based on a scattering effect to muons in the charged particles.

According to an embodiment of the present disclosure, the device further includes: an image reconstructing unit configured to reconstruct a material distribution map with an imaging algorithm according to a corresponding relationship among the blocking effect, the scattering effect and the material property, the imaging algorithm including a PoCA algorithm and/or a MLSD-OSEM algorithm, and/or so forth.

According to an embodiment of the present disclosure, the device further includes: an updating unit configured to update information about the material, to perform a next iterative process.

According to an embodiment of the present disclosure, the device further includes: a categorizing unit configured to categorize the material of the moving object according to a corresponding relationship among the scattering effect, the blocking effect and the material property.

According to an embodiment of the present disclosure, the image reconstructing unit includes a plurality of image processing sub-units capable of performing parallel processes, configured to process multiple pieces of track information of the charged particles in parallel.

According to an embodiment of the present disclosure, the track information of the charged particles includes an incident time, an incident position and an incident direction, an emission time, an emission position and an emission direction of the charged particles.

According to an embodiment of the present disclosure, the matching module includes: a time-difference analyzing unit configured to analyze a time difference between the incident time and the emission time; and a time-position matching unit configured to match the time and position of the track information of the charged particles and the motion trajectory of the moving object according to the incident position, the emission position and the analyzed time difference.

According to yet another aspect of the present disclosure, there is provided a system for inspecting a moving object based on cosmic rays, including: a monitoring device configured to track a motion trajectory of the inspected moving object and record a time-position corresponding relationship of the moving object; a position sensitive detector configured to detect information about charged particles in the cosmic rays, the information about charged particles including track information of the charged particles; a console configured to detect whether a speed of the inspected moving object is within a preset range, determine the moving object by matching positions of the motion trajectory and the track information, reconstruct the track of the charged particles according to the information about the charged particles and recognize the material inside the moving object.

According to an embodiment of the present disclosure, the preset range of the speed of the moving object is selected to ensure that at least one charged particle can be detected from per 100 square centimeters of a surface area of the moving object.

According to an embodiment of the present disclosure, the position sensitive detector is configured to have a capability of detecting muons and electrons from the cosmic rays.

According to an embodiment of the present disclosure, the position sensitive detector is configured to have a capability of detecting a material with a medium-to-high atomic number which is higher than the atomic number of aluminum, and a material with a low atomic number which is lower than the atomic number of aluminum. Wherein the material with a low atomic number is recognized based on a blocking effect to electrons; and the material with a medium-to-high atomic number is recognized based on a scattering effect to muons.

According to an embodiment of the present disclosure, the position sensitive detector is configured as a part of the system for inspecting a moving vehicle, the position sensitive detector is placed in an inspection channel, and a moving vehicle to be inspected passes through the position sensitive detector.

According to an embodiment of the present disclosure, the position sensitive detector includes: a first group of position sensitive detectors, disposed at a first side of the inspection channel, and configured to measure positions and directions of the incident charged particles entering the inspection channel; and a second group of position sensitive detectors, disposed at a second side of the inspection channel, which is opposite to the first side, and configured to measure positions and directions of the emission charged particles exiting from the inspection channel.

According to an embodiment of the present disclosure, the position sensitive detector further includes: a third group of position sensitive detectors, disposed at a third lateral side different from the first side and the second side of the inspection channel, and configured to measure positions and directions of the emission charged particles exiting from the inspection channel; and/or a fourth group of position sensitive detectors, disposed at a fourth lateral side different from the first side, the second side and the third side of the inspection channel, and configured to measure positions and directions of the emission charged particles exiting from the inspection channel.

According to an embodiment of the present disclosure, an angle between the third group of position sensitive detectors and/or the fourth group of position sensitive detectors, and the second group of position sensitive detectors is greater than or equal to 90 degrees and less than 180 degrees.

According to an embodiment of the present disclosure, the position sensitive detector includes a GEM detector, an MRPC detector, a drift chamber or a drift tube array.

According to an embodiment of the present disclosure, the drift tube array is composed of a plurality of aluminum drift tubes forming a structure of a plurality of super-layers, each super-layer at least includes a first planar aluminum drift tube in a first direction and a second planar drift tube in a second direction different from the first direction.

According to an embodiment of the present disclosure, the first planar aluminum drift tube and the second planar aluminum drift tube each includes two rows of aluminum drift tubes in parallel to each other.

According to an embodiment of the present disclosure, the console includes: a signal processing unit, configured to receive a measurement signal of incident charged particles from the first group of position sensitive detectors and measurement signals of emission charged particles from the second group of position sensitive detectors and/or the third group of position sensitive detectors and/or the fourth group of position sensitive detectors, the signal processing unit is configured to analyze scattering of the charged particles passing through the material in the inspection channel, to acquire a spatial distribution of a scattering center in the inspection channel or reconstruction of the track of the charged particles, according to the measured incident positions and directions, emission positions and directions of the charged particles.

According to an embodiment of the present disclosure, the monitoring device includes combination of any one or more of: a thermal imager, a camera, a pressure sensor, an optical sensor.

According to an embodiment of the present disclosure, the monitoring device includes a depth camera.

According to the method, the device and the system for inspecting a moving object based on cosmic rays of the present disclosure, the efficiency of security inspection and the quality of the radiation imaging can be improved.

It is to be understood that both the foregoing general description and the following detailed description are exemplary only and are not restrictive of the present disclosure.

BRIEF DESCRIPTION OF THE DRAWINGS

The above and other features and advantages of the present disclosure will become more apparent from detail exemplary embodiments thereof described with reference to the accompanying drawings.

DETAILED DESCRIPTION

Figure 1:
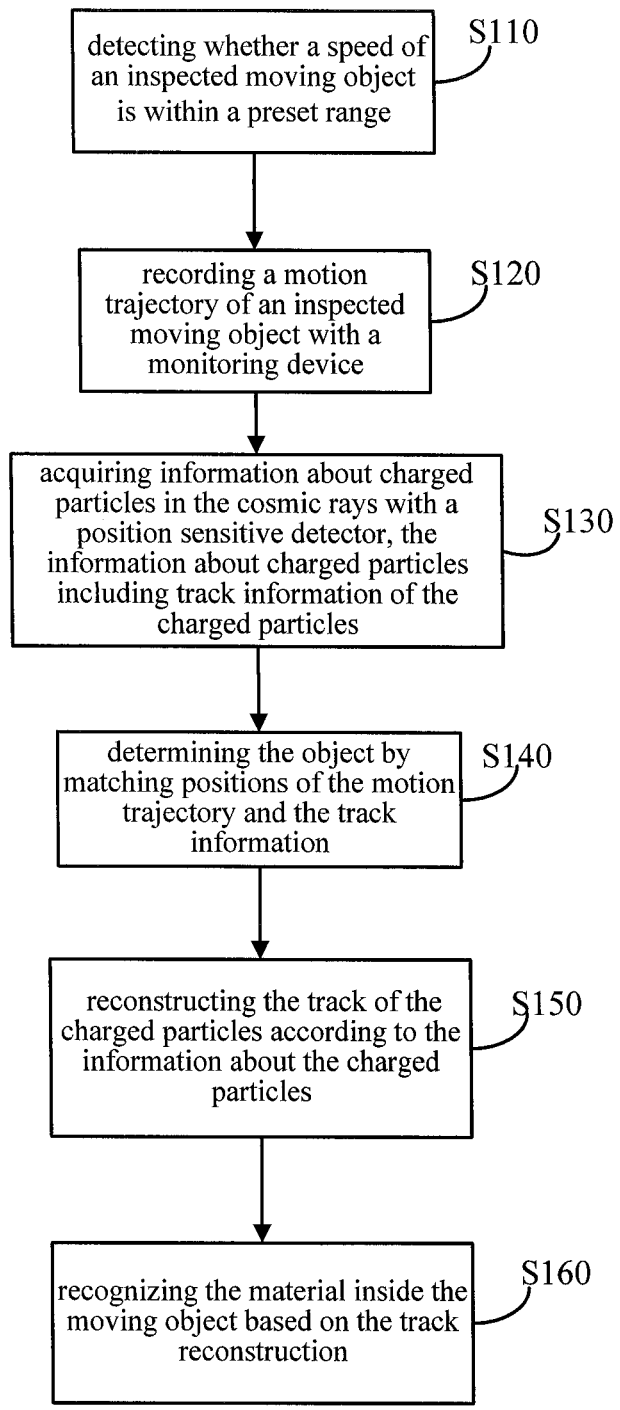
FIG. 1 is a flow chart schematically illustrating a method for inspecting a moving object based on cosmic rays according to an example embodiment of the present disclosure.

Exemplary embodiments will now be described more fully with reference to the accompanying drawings. However, the exemplary embodiments may be embodied in many forms and should not be construed as limited to the embodiments set forth herein. Rather, these embodiments are provided so that the present disclosure will be thorough and complete, and will fully convey the concept of example embodiments to those skilled in the art. Throughout the figures, the same reference numerals denote the same or similar parts, and thus a repeated description thereof will be omitted.

Furthermore, the described features, structures, or characteristics may be combined in any suitable manner in one or more embodiments. In the following description, numerous specific details are set forth in order to provide a thorough understanding of the embodiments of the present disclosure. However, it will be recognized by those skilled in the art that the technical solution of the present disclosure may be practiced without one or more of the specific details, or that other methods, components, materials, devices, steps, and the like may be employed. In other instances, well-known structures, methods, devices, implementations, materials, or operations are not shown or described in detail to avoid obscuring aspects of the present disclosure.

The block diagrams shown in the drawings are only functional entities and do not necessarily have to correspond to physically separate entities. That is, these functional entities may be implemented in software, or these functional entities or a part of these functional entities may be implemented in one or more software-hardened modules, or these functional entities may be implemented in different networks and/or processor devices and/or microcontroller devices.

When cosmic rays pass through the atmosphere to reach the Earth, primary cosmic ray particles are composed of about 90% of protons and 10% of alpha particles. The primary cosmic ray particles reach the earth at an altitude of about 30,000 meters high, and collide to atmospheric nuclei to produce π mesons. At an altitude of 9,000 meters, the primary cosmic ray particles decay into muons and neutrinos, and a part of these muons further decay into neutrinos and electrons. The cosmic ray particles that reach the Earth's surface are mainly composed of muons, protons, and electrons in the ratio of 70:1:7, and the average energy and total flux are shown in Table 1. The mean energy of the muons is ¾ GeV, the flux is about 10000/(minute*m$^2$), the velocity is 0.998c (c is the speed of light), the average half-life is $2.2*10^{-6}$ s, and the angular distribution is proportional to $\cos^2\alpha$ ($\alpha$ is a vertical angle).

TABLE 1

Average energy and total flux of cosmic ray particles reaching the Earth's surface

| Type of Particles | Average Energy/MeV | Total Flux |
|---|---|---|
| Muon | 3928.135 | $1.241 \times 10^{-2}$ cm$^{-2}$s$^{-1}$ |
| Neutron | 222.715 | $2.384 \times 10^{-3}$ cm$^{-2}$s$^{-1}$ |
| Proton | 852.720 | $1.773 \times 10^{-4}$ cm$^{-2}$s$^{-1}$ |
| γ Particle | 28.024 | $1.748 \times 10^{-2}$ cm$^{-2}$s$^{-1}$ |
| Positron | 111.216 | $1.184 \times 10^{-3}$ cm$^{-2}$s$^{-1}$ |
| Negative Electron | 77.585 | $1.980 \times 10^{-3}$ cm$^{-2}$s$^{-1}$ |

Muons have high energy, strong penetrating ability, and small scattering cross sections, and do not tend to be absorbed in the detection area, but to be scattered. Therefore, they may be used to detect internal structure of a large object and measure high-Z substances such as heavy nuclear substance inside a shielding layer. The principle of material recognition and image reconstruction based on muons is mainly as follows. A muon shifts its original orbit when it passes through a substance under the effect of multiple Coulomb scattering; the scattering density is proportional to the radiation length of the muon in the substance; since the radiation length and the atomic number have a corresponding relationship, material recognition may be performed by measuring scattering angle distribution of the muon when passing through the substance.

Electrons have an even more significant scattering effect, and have a large scattering cross section. Since electrons tend to be deflected at a large angle or absorbed when passing through a medium-Z or low-Z substance with a certain thickness in the detector area, electrons may be used to measure distribution of drugs/explosives and other low-Z substances. Research results show that a substance with a high atomic number has obvious specificity to the scattering effect of muons, and a substance with a low atomic number has obvious specificity to the blocking effect of electrons. Thus, with this property, it is possible to perform material discrimination of different partitions. Compared with the traditional material measurement technology using X-ray, gamma ray, proton, neutron and the like, the new detection technology using cosmic rays has attracted much attention due to its advantages of strong penetrating ability, requiring no external radiation protection and others. Moreover, the detection technology using cosmic rays can also detect an internal structure of a large object and distribution of heavy nuclear material inside a shielding layer.

In 2001, the Los Alamos National Laboratory (LANL) in United States took the lead in the use of cosmic ray muon radiation for imaging of heavy nuclear matter, and proposed a method for distinguishing materials of a high atomic number and a low atomic number by utilizing the principle of multiple Coulomb scattering of cosmic ray muons in material. Since then, many countries and research institutions, including the United Kingdom, Italy, Hungary and China's Tsinghua University, Institute of nuclear technology applications, China Institute of Atomic Energy, etc., have carried out relevant researches. A detector used in such a measurement system is mainly based on a large area of MRPC which is sensitive to positions or a drift-tube detector array. However, the above material recognition method and system merely uses muons, which results in long signal acquiring time, and insufficient material distinguishing capability.

FIG. 1 is a flow chart schematically illustrating a method for inspecting a moving object based on cosmic rays according to an example embodiment of the present disclosure.

As shown in FIG. 1, at step S110, it is detected whether a speed of an inspected moving object is within a preset range.

According to an exemplary embodiment, the preset range of the speed of the moving object may be selected to ensure that at least one charged particle can be detected from per 100 square centimeters of the surface area of the moving object.

Since cosmic ray particles fly at a speed (approximately the light speed) much higher than a speed of a vehicle, the speed of the vehicle has little effect on the track of the cosmic ray. However, if the speed of the vehicle is too fast, it tends to cause an error in time-position matching of the trajectory of the vehicle and the ray particles. Moreover, if too few particles are received, it may be difficult to acquire accurate material information. Therefore, the speed of the vehicle should be controlled in an appropriate range, to ensure that at least one charged particle such as a muon can be detected from an area of per 100 square centimeters of the vehicle.

At step S120, a motion trajectory of an inspected moving object is recorded with a monitoring device.

According to an example embodiment, the inspected moving object may be a moving vehicle on a traffic path, which is to be inspected. The inspected moving vehicle may be traveling in an inspection channel, while a video monitoring technology may be utilized to acquire the position of the inspected moving vehicle in the channel. For example, multiple depth cameras covering the channel may be employed to detect and track the moving vehicle. Once it is detected that a vehicle appears, the motion trajectory of the target moving object may be acquired through a tracking algorithm. The position of the vehicle on the ground of the channel may be calculated in real time, and transmitted to a system for inspecting a moving object. The depth cameras may utilize for example kinect from Microsoft to achieve this purpose.

At step S130, information about charged particles in the cosmic rays is acquired with a position sensitive detector, the information about charged particles including track information of the charged particles. According to an exemplary embodiment, the position sensitive detector may be configured to have a capability of detecting muons and electrons from the cosmic rays.

According to an exemplary embodiment, wherein the position sensitive detector may include a GEM detector, an MRPC detector, a drift chamber, or a drift tube array.

According to an exemplary embodiment, the position sensitive detector may be configured as a part of the system for inspecting a moving vehicle. Specifically, the position sensitive detector may be placed in the inspection channel, and the moving vehicle to be inspected may pass through the position sensitive detector.

In the embodiments of the present disclosure, the radiation source utilized is a natural cosmic ray, and the detection component is designed in a channel form. During the measurement process, a vehicle may keep moving with a uniform and slow speed. The motion trajectory of the vehicle and the cosmic ray signal passing through the vehicle are acquired simultaneously by a monitoring device and multiple-side position sensitive detectors. The information is matched, and a type of material inside the vehicle may be obtained through an appropriate imaging algorithm. If the moving vehicle contains dangerous substances such as heavy nuclear substances or drugs/explosives, a signal processing unit may analyze the type and the location of the dangerous goods, and issue a warning through an alarm system.

According to an example embodiment, the information about charged particles may include a scattering angle of the charged particles, an average momentum of the particles, the number of the particles, an acting area of the particles, an acting duration time of the particles, and the like. The track information of the charged particles may include an incident time, an incident position and an incident direction, as well as an emission time, an emission position and an emission direction of the charged particles.

At step S140, the moving object is determined by matching positions of the motion trajectory and the track information.

According to an exemplary embodiment, determining the moving object by matching positions of the motion trajectory and the track information may include: a time difference between the incident time and the emission time is analyzed, and the time and position of the track information of the charged particles and the motion trajectory of the moving object are matched according to the incident position, the emission position and the analyzed time difference.

At step S150, the track of the charged particles is reconstructed according to the information about the charged particles.

According to an exemplary embodiment, reconstructing the track of the charged particles may include: an initial value of an atomic number and an initial value of a relative mass of the material are estimated, wherein a parameter Ratio denotes a ratio of a scattering effect of the material on the charged particles against a blocking effect of the material on the charged particles; a radiation length is calculated according to a relationship among the initial value of the atomic number and the initial value of the relative mass and the radiation length; a thickness of the material is obtained according to the radiation length; and the blocking effect and the scattering effect of the material are calculated according to the initial value of the atomic number or the initial value of the relative mass and the thickness of the material.

According to an exemplary embodiment, the method further includes: a material distribution map is reconstructed with an imaging algorithm, according to a corresponding relationship among the blocking effect, the scattering effect and material properties. The imaging algorithm may include a PoCA algorithm and/or a MLSD-OSEM algorithm, and/or so forth.

According to an example embodiment, the method may further include: the material information is updated for the next iteration.

According to an example embodiment, wherein multiple pieces of track information of the charged particles are processed in parallel during the reconstruction of the track.

The muons and electrons generated based on cosmic rays do not depend on natural densities of the muons and electrons from the sky, which cannot be artificially increased. Thus, with the limit of the entering muons and electrons from the sky, it is desirable to expose the moving object to the entering stream of the muons and electrons from the sky during a minimum time period, to ensure that a sufficient number of muons and electrons may penetrate the inspected moving object and scattered by the inspected moving object, so as to generate a scanning image with sufficient details to enable recognition of the moving object and/or differentiation from the surrounding echo zone. The operation may be referred to as imaging scanning, and the scanning duration time may be designated by a time of exposure to the muons and electrons required for generating a scanning image of a particular quality. A long scanning duration time may provide more image details in an image than in an image acquired with a short scanning duration time. In a practical inspection system, there is a trade-off between the inspection throughput (e.g., based on the density of the vehicles) and the reliability of the inspection.

At step S160, the material inside the moving object is recognized based on the track reconstruction.

According to an exemplary embodiment, the position sensitive detector may be configured to have a capability of detecting a material with a medium-to-high atomic number which is higher than the atomic number of aluminum, and a material with a low atomic number which is lower than the atomic number of aluminum. The material with a low atomic number may be recognized by the blocking effect to the electrons, and the material with a medium-to-high atomic number may be recognized by the scattering effect to the muons.

According to an exemplary embodiment, the method may further include: the material of the moving object is categorized according to the corresponding relationship among a scattering parameter, a blocking parameter and the material property.

Control of the entire imaging process, data transmission, image reconstruction, and data processing may be performed by a console, such as a computer. The position information of the inspected moving vehicle, the response of the detector and the like may be inputted into the computer through a data acquisition device. The computer may process the position information of the inspected moving vehicle to obtain the motion trajectory thereof, process the response of the cosmic ray in the detector, reconstruct the particle information, and match the motion trajectory of the inspected moving vehicle with the cosmic ray particles, to obtain scattering and absorption information generated by the cosmic rays on a corresponding portion of the moving vehicle (or a corresponding portion of carried object). Then reconstruction of a transmission image, a tomographic image and a three-dimensional image of the object may be completed for final presentation on a display.

It may be determined whether the inspected moving vehicle carries heavy nuclear substance according to the above imaging result. If the inspected moving vehicle carries heavy nuclear substance, the signal processing unit in the computer may further analyze the type and location of the dangerous goods and issue a warning through the alarming system. It may also be determined whether the inspected moving vehicle carries explosives or drugs according to the above imaging result. If the inspected moving vehicle carries explosives or drugs, the signal processing unit may further analyze the type and location of the dangerous goods and issue a warning through the alarming system.

The embodiments of the present disclosure propose a novel method for inspecting a moving object based on cosmic rays, using ultra-efficient inspection methods based on muons and electrons carried in natural cosmic rays as detection means, utilizing the wide coverage characteristics of cosmic rays, so that the moving object under inspection (i.e. the inspected vehicle) can be detected in a motion state. During the inspection process, the vehicle does not need to be flamed out, but travels slowly forward. The inspection process is convenient and easy for operation. In addition, the method may also be used to detect multiple vehicles at the same time, and can improve the detection efficiency to the greatest extent. Moreover, since the detection means uses the signal of natural cosmic rays, it does not pose any extra damage to the driver, and the driver may pass through safely. The method has extremely high security, applicable to all kinds of vehicles, and may detect both of high-Z material such as nuclear material and low-Z material such as drugs and explosives, providing basic public security for the global anti-terrorism and the whole community.

Figure 2:
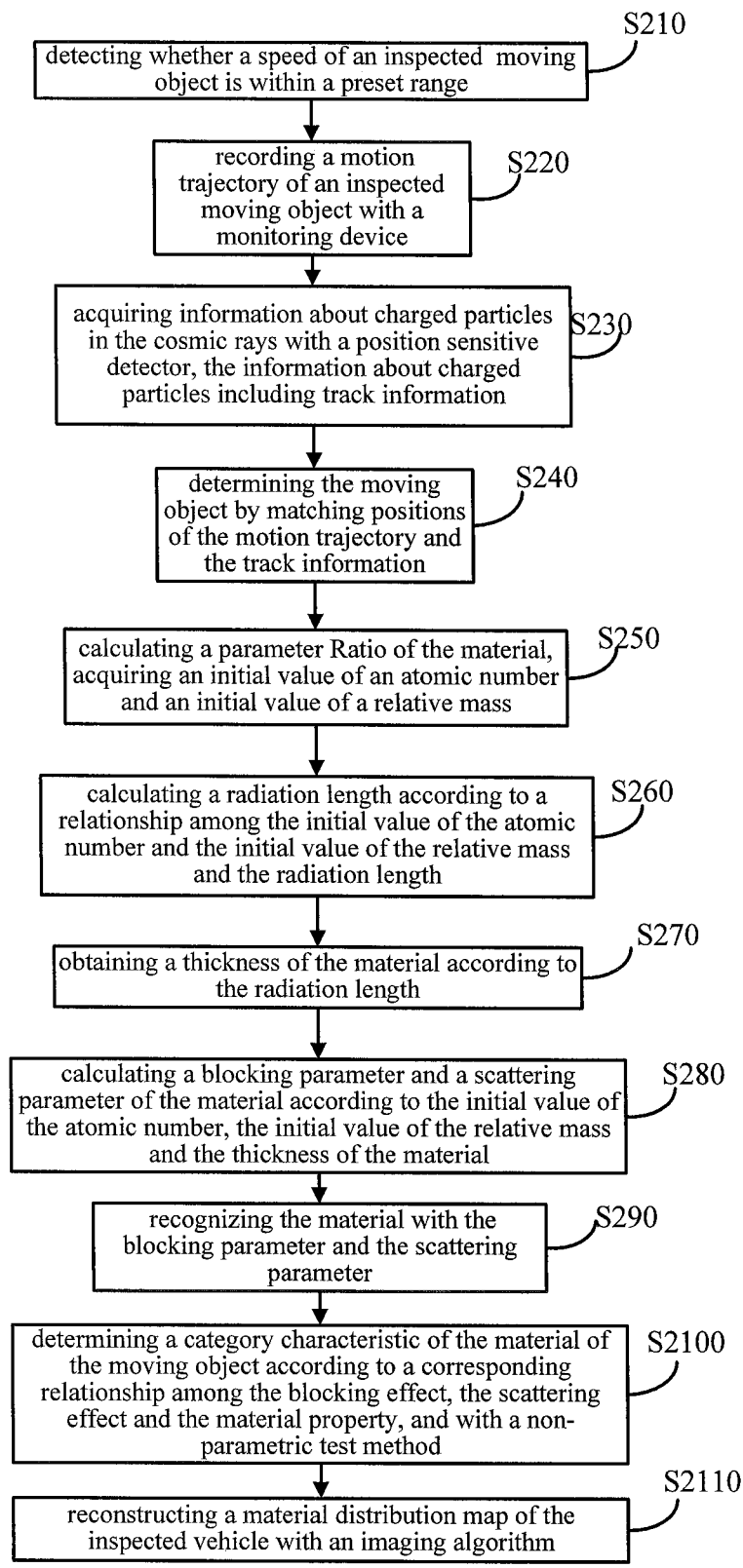
FIG. 2 is a flow chart schematically illustrating a method for inspecting a moving object based on cosmic rays according to an example embodiment of the present disclosure.

FIG. 2 is a flow chart schematically illustrating a method for inspecting a moving object based on cosmic rays according to an example embodiment of the present disclosure.

As shown in FIG. 2, at step S210, it is detected whether a speed of an inspected moving object is within a preset range.

At step S220, a motion trajectory of a moving object is recorded with a monitoring device.

Since the vehicle is moving in the channel during the inspection, a monitoring device may be used to record the trajectory of the vehicle in the channel, in order to match it with the position of the cosmic ray particles detected by the detector. Conventional methods for this purpose may be video positioning, optical positioning, pressure sensors and so on. Since the vehicle is traveling slowly forward, and the trajectory approximates to a straight line, it does not require too much on the monitoring device. For example, multiple cameras may be used to perform video tracking, and merely top-view cameras may satisfy the positioning requirement. When optical positioning is employed, merely one column of optical devices arranged at one side may satisfy the positioning requirement.

At step S230, information about charged particles in the cosmic rays is acquired with a position sensitive detector, the information about charged particles including track information of the charged particles.

At step S240, the moving object is determined by matching positions of the motion trajectory and the track information.

When charged particles in the cosmic rays (mainly muons and electrons at sea level) pass through media, scattering and absorption may occur. A position sensitive detector with high sensitive and a larger area may be used to detect a time, positions and directions of the particles incident to the media and exiting from the media, to obtain a scattering angle of the particles and to determine whether the particles are blocked by the media.

At step S250, a parameter Ratio of the material is calculated according to the track information of the charged particles, an initial value of an atomic number and an initial value of a relative mass of the material are acquired, wherein the parameter Ratio denotes a ratio of a scattering effect $R_{scatter}$ of the material on the charged particles against a blocking effect $R_{stop}$ of the material on the charged particles.

The parameter Ratio (Ratio=$R_{scatter}/R_{stop}$, where $R_{scatter}$ denotes the scattering effect, and $R_{stop}$ denotes the blocking effect) represents a blocking capability of a substance by measuring a ratio between a portion of the cosmic rays blocked by the substance and a portion of the cosmic rays scattered by the substance. It is significantly specific for different materials. Differentiation in blocking effects of different low-Z substances to the cosmic rays is larger than differentiation in scattering effects of different low-Z substances to the cosmic rays. On the contrary, differentiation in scattering effects of different high-Z substances to the cosmic rays is larger than differentiation in blocking effects of different low-Z substances to the cosmic rays. For a high-Z substance having an atomic number larger than that of Al, the parameter Ratio exhibits an excellent linear characteristic.

The parameter Ratio is calculated according to the track of the charged particles in cosmic ray. The parameter Ratio is related to a scattering angle, an average momentum of the particles, the number of the particles, an acting area of the particles, an acting duration time of the particles, and the like. The initial value of the atomic number $Z^0$ of the material is estimated ($A^0$, where A denotes a relative mass). The estimation of the initial value of the atomic number of the material may be performed through calibration of various materials.

At step S260, a radiation length $L_{rad}$ is calculated according to a relationship among the initial value of the atomic number and the initial value of the relative mass and the radiation length $L_{rad}$.

The calculation formula of $L_{rad}$ is as follows.

$$L_{rad} = \frac{716.4 \text{ g} \cdot \text{cm}^{-2} A^0}{\rho \cdot Z^0 (Z^0 + 1) \ln(287 / \sqrt{Z^0})}$$

Where, $\rho$ denotes a density of the material.

At step S270, a thickness L of the material is obtained according to the radiation length $L_{rad}$.

The calculation formula of L is as follows.

$$\begin{cases} R_{scatter} = \frac{\sigma_\theta^2 \cdot p^2}{L} \\ R_{scatter} = = \left(\frac{14.1}{c}\right)^2 \cdot \frac{1}{L_{rad}} (p \approx 3 GeV) \end{cases}$$

Where $\sigma_\theta$ denotes a scattering angle, and p denotes an average momentum of the incident particles.

Since the thickness of the material to be penetrated are important for accurate calculation of the scattering effect and the blocking effect, and in turn, are important for recognition of the material, the thickness L of the material is obtained according to the radiation length $L_{rad}$ which is derived from the atomic number $Z^0$ ($A^0$). That is, a radiation length $L_{rad}$ of a pixel position is obtained according to a relationship between an estimated $Z^0$ ($A^0$) and the radiation length, and then the thickness L of the material is obtained according to the radiation length $L_{rad}$ and the scattering angle.

At step S280, a blocking parameter and a scattering parameter of the material are calculated according to the initial value of the atomic number, the initial value of the relative mass and the thickness L of the material.

The calculation formulas of the scattering parameter and the blocking parameter are as follows.

$$\begin{cases} R_{scatter} = \frac{\sigma_\theta^2 \cdot p^2}{L} \\ R_{stop} = \frac{N_{stop} / (a_{stop} \cdot t_{stop})}{N_{scatter} / (a_{scatter} \cdot t_{scatter})} \cdot \frac{p}{L} \end{cases}$$

Where, $N_{scatter}/(a_{scatter} \cdot t_{scatter})$ denotes within a time period $t_{scatter}$, the number $N_{scatter}$ of particles scattered by the substance which are detected on an imaging area or volume $a_{scatter}$, and $N_{stop}/(a_{stop} \cdot t_{stop})$ denotes within a time period $t_{stop}$, the number $N_{stop}$ of particles blocked by the substance which are detected on an imaging area or volume $a_{stop}$.

At step S290, the material is recognized with the blocking parameter and the scattering parameter.

At step S2100, a category characteristic of the material of the moving object is determined according to a corresponding relationship among the blocking parameter, the scattering parameter and the material property, and with a non-parametric test method.

During the imaging process, multiple effective tracks of charged particles are independent to each other and may be processed in parallel. Therefore, a multi-core CPU or a multi-thread GPU may be used to speed up image reconstruction.

Since imaging quality may be improved as cosmic ray particles increase and the effect of single reconstruction may not be desirable, it may be necessary to update the data in real time and add new particle tracks to carry out a next iterative process.

At step S2110, after one inspection process of the same moving object is completed, and effective tracks of all the charged particles are iterated, or when at the above step S2100, it is preliminarily determined that suspicious material exists inside the moving object with the non-parametric test method, a material distribution map of the whole inspected vehicle is reconstructed with an imaging algorithm, according to a corresponding relationship among the scattering parameter, the blocking parameter and the material property. The reconstruction of the material distribution map may result in a more desirable reconstructed image, and thus it may more accurately determine the category of the material, the distribution position of the material inside the moving object.

According to the initial value range, the scattering parameter and the blocking parameter are calculated and then the material is recognized. That is, a material with a low atomic number is recognized mainly according to a blocking effect, including a scattering effect and an absorbing effect of the substance to the muons and electrons; while a material with a medium-to-high atomic number is recognized mainly according to a scattering effect, i.e. a scattering effect to the muons.

A category characteristic of the particular object is determined according to a corresponding relationship among the scattering parameter, the blocking parameter and the material property, and with a non-parametric test method. Or, a material distribution map of the whole inspected vehicle is reconstructed. The imaging process may be performed based on a PoCA algorithm for reconstructing tracks or based on a MLSD-OSEM algorithm for maximum likelihood iterative reconstruction. Specifically, MLSD is an improvement of the PoCA algorithm, which additionally considers probability statistic information of scattering angles and scattering displacement, acquires a reconstructed image using the maximum likelihood estimation iterative method, has a higher imaging resolution, and is better for object detection composed of multiple materials. While the OSEM algorithm can improve the speed of convergence and reduce the computation time. By properly selecting a subset, the imaging quality can also be improved.

When it is found in the figure that a dangerous article distribution area is present, it may be analyzed whether the dangerous article inside the moving object is a high-Z nuclear substance or a low-Z drug, explosive, etc., issue an alarm message or display as an image. For example, the distribution of different kinds of dangerous goods may be recognized in different colors in the image.

Figure 3:
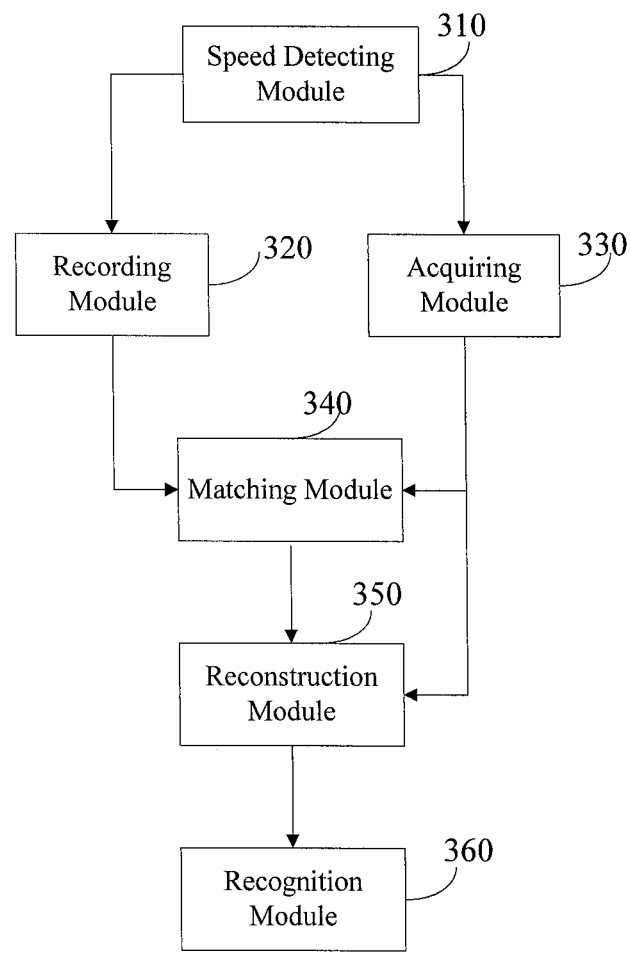
FIG. 3 is a block diagram schematically illustrating a device for inspecting a moving object based on cosmic rays according to an example embodiment of the present disclosure.

FIG. 3 is a block diagram schematically illustrating a device for inspecting a moving object based on cosmic rays according to an example embodiment of the present disclosure.

As shown in FIG. 3, the device includes a speed detection module 310 configured to detect whether a speed of the inspected moving object is within a preset range; a recording module 320 configured to record a motion trajectory of the inspected moving object with a monitoring device; an acquiring module 330 configured to acquire information about charged particles in the cosmic rays with a position sensitive detector, the information about charged particles including track information of the charged particles; a matching module 340 configured to determine the moving object by matching positions of the motion trajectory and the track information; a reconstruction module 350 configured to reconstruct the track of the charged particles according to the information about the charged particles; and a recognition module 360 configured to recognize the material inside the moving object based on the track reconstruction.

According to an exemplary embodiment, the preset range of the speed of the moving object is selected to ensure that at least one charged particle can be detected from per 100 square centimeters of a surface area of the moving object.

According to an exemplary embodiment, the position sensitive detector is configured to have a capability of detecting muons and electrons from the cosmic rays.

According to an exemplary embodiment, the position sensitive detector is configured to have a capability of detecting a material with a medium-to-high atomic number which is higher than the atomic number of aluminum, and a material with a low atomic number which is lower than the atomic number of aluminum. Wherein the material with a low atomic number is recognized based on a blocking effect to electrons; and the material with a medium-to-high atomic number is recognized based on a scattering effect to muons.

According to an exemplary embodiment, the position sensitive detector is configured to reconstruct tracks of the muons and electrons of the moving object based on signals from the position sensitive detector; measure incident momentum and emission momentum of the muons based on the signals from the position sensitive detector; determine spatial distribution of the scattering density in the moving object; and construct the scanning image inside the moving object according to the trajectory of the moving object, the momentums, the spatial distribution of the scattering density.

According to an exemplary embodiment, the position sensitive detector includes a GEM detector, an MRPC detector, a drift chamber or a drift tube array.

According to an exemplary embodiment, the position sensitive detector is configured as a part of the system for inspecting a moving vehicle, the position sensitive detector is placed in an inspection channel, and a moving vehicle to be inspected passes through the position sensitive detector.

According to an exemplary embodiment, the reconstruction module includes: an estimation unit configured to calculate a parameter Ratio of the material according to the track information of the charged particles, estimate an initial value of an atomic number and an initial value of a relative mass of the material, the parameter Ratio denoting a ratio of a scattering parameter of the material on the charged particles against a blocking parameter of the material on the charged particles; a radiation-length calculating unit configured to calculate a radiation length according to a relationship among the initial value of the atomic number and the initial value of the relative mass and the radiation length; a thickness calculating unit configured to obtain a thickness of the material according to the radiation length; a blocking-scattering calculating unit configured to calculate a blocking parameter and a scattering parameter of the material according to the initial value of the atomic number, the initial value of the relative mass and the thickness of the material; and the material can be recognized with the blocking parameter and the scattering parameter, wherein a material with a low atomic number can be recognized based on a blocking effect to electrons in the charged particles; and a material with a medium-to-high atomic number can be recognized based on a scattering effect to muons in the charged particles.

According to an exemplary embodiment, the device further includes: an image reconstructing unit configured to reconstruct a material distribution map with an imaging algorithm according to a corresponding relationship among the blocking parameter, the scattering parameter and the material property, the imaging algorithm including a PoCA algorithm and/or a MLSD-OSEM algorithm, and/or so forth.

According to an exemplary embodiment, the device further includes: an updating unit configured to update information about the material, to perform a next iterative process.

According to an exemplary embodiment, the device further includes: a categorizing unit configured to categorize the material of the moving object according to a corresponding relationship among the scattering parameter, the blocking parameter and the material property.

According to an exemplary embodiment, the image reconstructing unit includes a plurality of image processing sub-units capable of performing parallel processes, configured to process multiple pieces of track information of the charged particles in parallel.

According to an exemplary embodiment, the track information of the charged particles includes an incident time, an incident position and an incident direction, an emission time, an emission position and an emission direction of the charged particles.

According to an exemplary embodiment, the matching module includes: a time-difference analyzing unit configured to analyze a time difference between the incident time and the emission time; and a time-position matching unit configured to match the time and position of the track information of the charged particles and the motion trajectory of the moving object according to the incident position, the emission position and the analyzed time difference.

In the device for inspecting a moving object based on cosmic rays according to the embodiments of the present disclosure, the motion trajectory of the inspected moving vehicle is recorded with a monitoring device, and matched with track of particles of cosmic rays detected by a detector, to detect cosmic ray particles passing through a moving vehicle. With a reconstruction algorithm, the category of the substance (such as nuclear materials, drugs, explosives and the like) of the object carried by the moving vehicle may be obtained. Since the applied cosmic rays have a wide coverage range and have no additional harm, after the signal of the cosmic ray particles is matched with the inspected moving vehicle, the inspected moving vehicle is not required to be coordinated or detained for inspection. The device may also inspect a plurality of moving vehicles at the same time, and the inspection process is relatively flexible, convenient and has high efficiency. Therefore, the device has a high potential in market applications.

Figure 4:
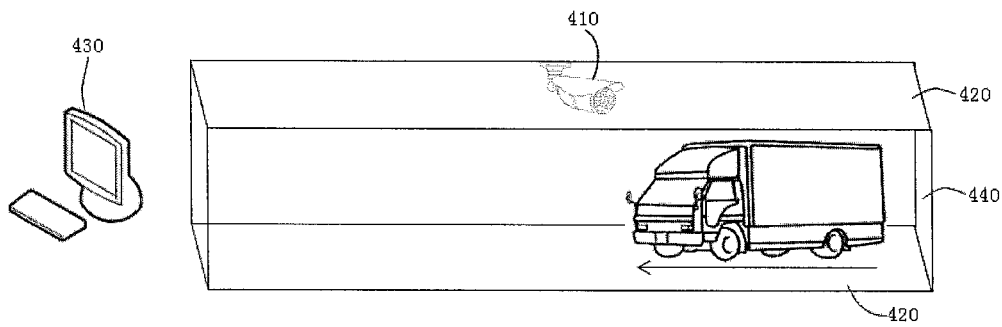
FIG. 4 is a diagram schematically illustrating a system for inspecting a moving object based on cosmic rays according to an example embodiment of the present disclosure.

FIG. 4 is a diagram schematically illustrating a system for inspecting a moving object based on cosmic rays according to an example embodiment of the present disclosure.

As shown in FIG. 4, the system includes a monitoring device 410, configured to track a motion trajectory of an inspected moving object 440, and record a time-position corresponding relationship of the moving object; a position sensitive detector 420, configured to detect information about charged particles in the cosmic rays, the information about charged particles including track information of the charged particles; a console 430, configured to detect whether a speed of the inspected moving object is within a preset range, determine the moving object by matching positions of the motion trajectory and the track information, reconstruct the track of the charged particles according to the information about the charged particles, and the material inside the moving object is recognized.

According to an exemplary embodiment, the preset range of the speed of the moving object may be selected to ensure that at least one charged particle can be detected from per 100 square centimeters of the surface area of the moving object.

According to an exemplary embodiment, the position sensitive detector may be configured to have a capability of detecting muons and electrons from the cosmic rays.

According to an exemplary embodiment, the position sensitive detector may be configured to have a capability of detecting a material with a medium-to-high atomic number which is higher than the atomic number of aluminum, and a material with a low atomic number which is lower than the atomic number of aluminum. The material with a low atomic number may be recognized by the blocking effect to the electrons, and the material with a medium-to-high atomic number may be recognized by the scattering effect to the muons.

According to an exemplary embodiment, the position sensitive detector may be configured as a part of the system for inspecting a moving vehicle. Specifically, the position sensitive detector may be placed in the inspection channel, and the moving vehicle to be inspected may pass through the position sensitive detector.

According to an exemplary embodiment, the position sensitive detector includes: a first group of position sensitive detectors, disposed at a first side of the inspection channel, and configured to measure positions and directions of the incident charged particles entering the inspection channel; and a second group of position sensitive detectors, disposed at a second side of the inspection channel, which is opposite to the first side, and configured to measure positions and directions of the emission charged particles exiting from the inspection channel.

According to an exemplary embodiment, the first group of position sensitive detectors and the second group of position sensitive detectors are respectively disposed on an upper side and a lower side of the channel. The first group of position sensitive detectors and the second group of position sensitive detectors respectively include three super-layer drift-tube arrays. When the cosmic rays pass through a moving vehicle, scattering and absorption may occur, and the track of the charged particle may change. The three super-layer drift-tube arrays in the first group of position sensitive detectors on the upper side are configured to detect a time, positions and directions of the charged particles of the incident cosmic rays, and the three super-layer drift-tube arrays in the second group of position sensitive detectors on the lower side are configured to detect a time, positions and directions of the charged particles of the emission cosmic rays. Then, the change of the motion trajectory of the particles may be obtained.

According to an exemplary embodiment, the position sensitive detector further includes: a third group of position sensitive detectors, disposed at a lateral side (a third side) different from the first side and the second side of the inspection channel, and configured to measure positions and directions of the emission charged particles exiting from the inspection channel; and/or a fourth group of position sensitive detectors, disposed at a lateral side (a fourth side) different from the first side, the second side and the third side of the inspection channel, and configured to measure positions and directions of the emission charged particles exiting from the inspection channel.

For example, in addition to disposing position sensitive detectors of a large area on the upper side and the lower side of the inspected vehicle, position sensitive detectors of large area may also be disposed on the left side and the right side of the channel. FIG. 4 is a four-side detector pattern, in which a first group (1) of position sensitive detectors are taken as incident detectors configured to detect a time, positions and directions of the incident cosmic ray particles, and the position sensitive detectors on the remaining three sides (2, 5, 6) are taken as receiving detectors configured to detect a time, positions and directions of the emission cosmic ray particles, so as to acquire more information about the cosmic ray particles, enhance the speed of inspection, improve the imaging quality, and improve the efficiency. The four-side position sensitive detectors respectively record a signal of cosmic ray particles, including positions and times of the particles impact on the detectors. When a particle is detected by an incident detector and is received by a receiving detector, the particle may be considered as a scattered particle; and if a particle is detected by an incident detector and is not received by a receiving detector, the particle may be considered as a blocked particle.

According to an exemplary embodiment, by increasing the area of the position sensitive detectors, increasing the length of the channel, the number of cosmic ray charged particles passing through the moving vehicle may also be increased, and thus the accuracy of the inspection may be improved and the false alarm rate may be reduced.

According to an exemplary embodiment, the position sensitive detector may also include: a fifth group of position sensitive detectors, disposed on a front side (a fifth side) of the inspection channel, which is different from the first side, the second side, the third side and the fourth side, configured to measure positions and directions of emission charged particles exiting from the inspection channel; and/or a sixth group of position sensitive detectors, disposed on a rear side of the inspection channel, which is different from the first side, the second side, the third side, the fourth side and the fifth side, configured to measure positions and directions of emission charged particles exiting from the inspection channel, so as to acquire more information about the cosmic ray particles, enhance the speed of inspection, improve the imaging quality, and improve the efficiency.

According to an exemplary embodiment, the position sensitive detector includes a GEM detector, an MRPC (Multi-Gap Resistive Plate Chambers) detector, a drift chamber or a drift tube array.

According to an example embodiment, wherein the drift tube array is composed of a plurality of aluminum drift tubes forming a structure of a plurality of super-layers. Each super-layer at least includes a first planar aluminum drift tube in a first direction and a second planar drift tube in a second direction different from the first direction.

According to an exemplary embodiment, the first planar aluminum drift tube and the second planar aluminum drift tube each includes two rows of aluminum drift tubes in parallel to each other.

Position sensitive detectors of a large area are placed in the channel, and a drift tube detector array with high inspection efficiency can be used. The drift tube detector array on each side consists of three super-layer of drift tubes. There is a drift tube detector array of a large area on each of the four sides (the upper side, the lower side, the left side and the right side) of the channel. The drift tube detector array on the upper side is configured to detect incident cosmic ray particles, and the detector arrays on the other three sides are configured to detect emission cosmic ray particles. Thus, particles passing through the detectors may be detected, and information about the response of the detectors may be transmitted to the console such as a computer, to process information about the position, the time and the direction of the charged particles. When a cosmic ray particle passes through a moving vehicle, a response may be generated, and the particle may be scattered or absorbed when passing through the moving vehicle and different objects carried by the moving vehicle.

According to an exemplary embodiment, the console includes a signal processing unit, configured to receive a measurement signal of incident charged particles from the first group of position sensitive detectors and measurement signals of emission charged particles from the second group of position sensitive detectors and/or the third group of position sensitive detectors and/or the fourth group of position sensitive detectors. The signal processing unit is configured to analyze scattering of the charged particles passing through the material in the inspection channel, to acquire a spatial distribution of a scattering center in the inspection channel or reconstruction of the track of the charged particles or a scanned image, according to the measured incident positions and directions, emission positions and directions of the charged particles.

For example, the system for inspecting a moving object may include: an inspection channel, configured for a inspected moving object (such as a moving vehicle) to travel through; a first group of position sensitive detectors, disposed on a first side of the inspection channel and configured to measure positions and directions of incident muons and electrons toward the inspection channel; a second group of position sensitive detectors, disposed on a second side of the inspection channel which is opposite to the first side, and configured to measure positions and directions of emission muons and electrons away from the inspection channel; and a signal processing signal, which may include a microprocessor, for example, configured to receive from the first group of position sensitive detectors a measurement signal of entering muons and electrons and from the second group of position sensitive detectors a measurement signal of exiting muons and electrons. The first group of position sensitive detectors and the second group of position sensitive detectors each may include a drift tube, arranged to allow measurement of positions of muons and electrons in the first direction and measurement of positions of muons and electrons in the second direction which is different from the first direction. The signal processing unit is configured to analyze scattering of the muons and electron caused by the material in the moving object according to the measured positions and direction of the muons and electrons in the entering direction and in the exiting direction, to obtain a spatial distribution of the scattering center in the inspection channel or a scanned image. The obtained spatial distribution of the scattering center or the scanned image may be used for display whether one or more moving objects exist in the inspection channel (such as whether a material having a high atomic number, including a nuclear material or a nuclear device) or not. Each position sensitive detector may be implemented in various configurations, including a drift cell having a drift tube filled with gas that can be ionized by muons and electrons. Such a system may be configured to detect one or more moving objects in the inspection channel using muons and electrons generated by natural cosmic rays.

The particle detection system can utilize drift tubes to enable tracking of charged particles such as muons and electrons passing through channels.

Other randomized processing methods may also be used in the implementation of tomographic scanning imaging.

The console is configured to take charge of the main control of operation of the entire system for inspecting a moving object, including mechanical control, electrical control and the like. The console is configured to process data acquired by the monitoring device and the position sensitive detectors, match the motion trajectory of the inspected moving vehicle in the channel, which is obtained by the monitoring device, and the particle track of the charged particles passing through the moving vehicle or the carried baggage, which is obtained by the position sensitive detectors, reconstruct the category of the substance of the article carried by the moving vehicle, and present it on the display. The display may be a conventional CRT display or a liquid crystal display.

The console may be a computer. The computer may be a high performance single PC, or the computer may be a workstation or a cluster.

A large amount of data generated by the position sensitive detectors during the scanning process and a large amount of data acquired by the monitoring device may be transmitted to the console in back-end through wireless transmission or a cable, a network cable or the like. Wired transmission may guarantee the speed of data transmission, reduce the loss of the signal in the transmission process, and improve the anti-jamming ability of signal transmission. Moreover, it can greatly reduce the technical difficulty of data collection and cost.

According to an exemplary embodiment, the monitoring device includes combination of any one or more of: a thermal imager, a camera, a pressure sensor, an optical sensor, and the like.

According to an exemplary embodiment, the monitoring device includes a depth camera.

Since during the inspection process, the moving vehicle is moving in the channel, the monitoring device is configured to record a motion trajectory of the moving vehicle in the channel, in order to be matched with the track of the cosmic ray particles detected by the position sensitive detectors. The position information of the inspected moving vehicle at each moment may be recorded with any technology which can position a moving target or a moving object. Alternatively, a plurality of moving vehicles may be inspected at the same time, and position information of each moving vehicle at each moment may be recorded.

When the inspected moving vehicle passes through the system for inspecting a moving object, since the speed of the cosmic ray particles is far larger than the traveling speed of the moving vehicle, the movement of the moving vehicle will not affect the track of the cosmic ray particles. When enough particles pass through the moving vehicle, the detector detects the track of the particles, and the track is matched with the motion trajectory of the moving vehicle, required information may be obtained through a certain reconstruction process.

In the system for inspecting a moving object based on cosmic rays of the embodiment of the present disclosure, charged particles in the cosmic rays may be detected with position sensitive detectors of a large area. By disposing layers of detectors around the channel, the incident track and the emission track of the particles may be detected. Moreover, the position of the moving vehicle at each moment in travelling may be recorded with the monitoring device. With processing of the computer, a scattering coefficient and an absorption coefficient of the charged particles passing through the moving vehicle and the carried baggage or luggage at each moment may be obtained, and a category of the substance of article carried by the moving vehicle may be reconstructed.

Figure 5:
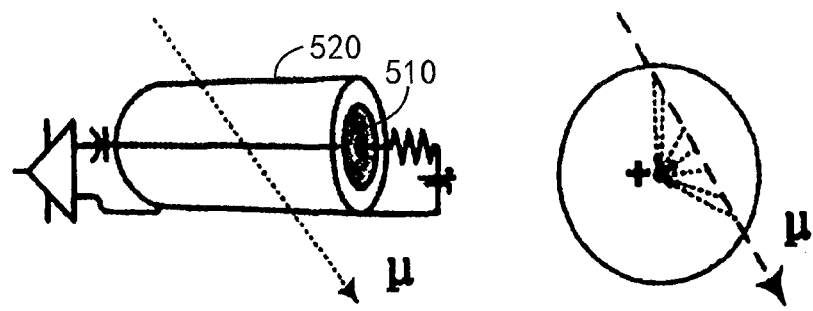
FIG. 5 is a diagram schematically illustrating a drift tube of a position sensitive detector in a system for inspecting a moving object based on cosmic rays according to an example embodiment of the present disclosure.

FIG. 5 is a diagram schematically illustrating a drift tube of a position sensitive detector in a system for inspecting a moving object based on cosmic rays according to an example embodiment of the present disclosure.

As shown in FIG. 5, the position sensitive detector is for example an aluminum drift tube detector array. A central anode 510 of a single drift tube is a gold-plated tungsten wire, a cathode 520 thereof is a thin aluminum tube. The end and the aluminum tube are sealed by a high pressure method or a high-pulse voltage method. Charged particles incident to a position inside the drift tube may generate initial ionized electrons at a certain position. The electrons drift to the proximity of the anode wire and avalanche. The anode wire receives a signal which may be coupled, amplified, screened and de-noised, for calculation of the measurement of the drifting time and the position of the particles.

According to an example embodiment, in order to prevent diffusion from affecting position resolution, each drift tube may include a mixture of non-flammable gases, such as argon, carbon dioxide and carbon tetrafluoride. For example, high pressure mixed gas of 93% Ar and 7% $CO_2$ at 3 times of atmospheric pressure is filled in the tube.

The system for inspecting a moving object includes a group of two or more planar position sensitive detectors arranged above the moving object to be imaged, to provide positions and angles (i.e., directions in a 3D Space) of the tracks of the entering muons and electrons. Each position sensitive detector is configured to measure positions and angles of tracks of the entering muons and electrons relative to two different directions. The muons and electrons pass through the channels in which the moving objects may be located and scatter to the material in the channels through which they pass. Another group of two or more planar position sensitive detectors are configured to record the positions and directions of the exiting muons and electrons. The drift tube in each detector is arranged to allow measurement of the positions of the muons and electrons in a first direction and positions of the muons and electrons in a second direction different from the first direction and possibly orthogonal to the first direction. A detector at a lateral side may be configured to detect tracks of muons and electrons in a horizontal direction. From the tracks of the entering and exiting muons and electrons, a scattering angle of each muon and electron may be calculated.

According to an example embodiments, a plurality of drift tubes are generally arranged closely to form a structure of multiple super-layers. For example, in each group of position sensitive detectors, each position sensitive detector includes three super-layers of drift tube arrays. However, the number of the structure of the super-layers may be selected depending on the particular circumstances of the application, without limiting the scope of the present disclosure.

Each super-layer contains two layers of drift tubes arranged in orthogonal to each other, to determine a two-dimensional coordinate of an incident particle. During a short time period, a particle simultaneously received by two layers of detectors spaced apart for a certain distance may be considered as the same charged particle.

According to an example embodiment, a plurality of drift tubes are generally arranged closely together to form a monolayer, and then two monolayers are superimposed orthogonally to form a super-layer, in order to determine a two-dimensional coordinate of an incident particle. In order to further increase the spatial resolution of the detector, each monolayer may be formed by two layers of detectors which are arranged closely in the same direction and superposed over half of the length of a tube. Thus, one super-layer may actually contain four layers of detectors, successively in X-X-Y-Y directions. Thereby, a high sensitive coordinate of a position of a particle passing through the super-layer of detectors may be determined. For example, if a drift tube has a diameter of 4 cm, a spatial position resolution of a double row of drift tubes may be up to 2 cm.

To achieve sufficient accuracy, the drift tube has to meet the following requirements. High insulation between the anode and the cathode should be ensured, to reduce leakage current. The anode wire should be positioned to ensure a minimum deviation of the center of the anode wire from the center of a positioning reference surface of the drift tube. The anode wire should be secured to ensure a tension of the anode wire to avoid damage. The aluminum tube should be clamped to ensure a minimum deviation of the aluminum tube from the center of a positioning reference surface of the drift tube.

Figure 6:
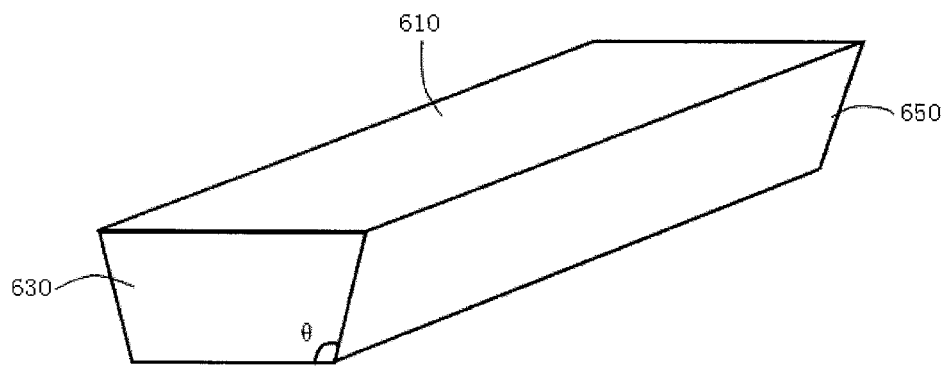
FIG. 6 is a diagram schematically illustrating a system for inspecting a moving object based on cosmic rays according to an example embodiment of the present disclosure.

FIG. 6 is a diagram schematically illustrating a system for inspecting a moving object based on cosmic rays according to an example embodiment of the present disclosure.

As shown in FIG. 6, the position sensitive detectors of the above system for inspecting a moving vehicle based on cosmic rays may be configured as a part of the system for inspecting a moving vehicle. The position sensitive detectors 610, 630, 650 may be placed in the inspection channel, and the moving vehicle to be inspected will pass through the position sensitive detectors. The position sensitive detectors include: a first group 610 of position sensitive detectors, disposed at a first side of the inspection channel, and configured to measure positions and directions of the incident charged particles entering the inspection channel; a second group of position sensitive detectors (not shown in the figure), disposed at a second side of the inspection channel, which is opposite to the first side, and configured to measure positions and directions of the emission charged particles exiting from the inspection channel; a third group 630 of position sensitive detectors, disposed at a lateral side (a third side) different from the first side and the second side of the inspection channel, and configured to measure positions and directions of the emission charged particles exiting from the inspection channel; and/or a fourth group 650 of position sensitive detectors, disposed at a lateral side (a fourth side) different from the first side, the second side and the third side of the inspection channel, and configured to measure positions and directions of the emission charged particles exiting from the inspection channel. The angle θ between the third group 630 of position sensitive detectors and/or the fourth group 650 of position sensitive detectors, and the second group of position sensitive detectors is greater than or equal to 90 degrees and less than 180 degrees.

For example, in order to increase particle detection efficiency, the detectors at the upper side and the lower side may be maintained horizontally, and the detectors at two lateral sides may be maintained at a certain angle to the ground. As shown in the figure, the detectors are arranged in a U shape, with the angle θ being greater than or equal to 90 degrees. In some embodiments, the angle may be 90 degrees. If the angle is greater than 90 degrees and less than 180 degrees, more emission charged particles may be detected. It is assumed that a vehicle enters the channel entrance at a moment t1, and leaves the exit of the channel at a moment t2, a total length of the vehicle is l, a speed of the vehicle is maintained at about v meters/sec, then a total length of the channel is about $(v \cdot (t_2 - t_1) + 2 \cdot l)$.

Figure 7:
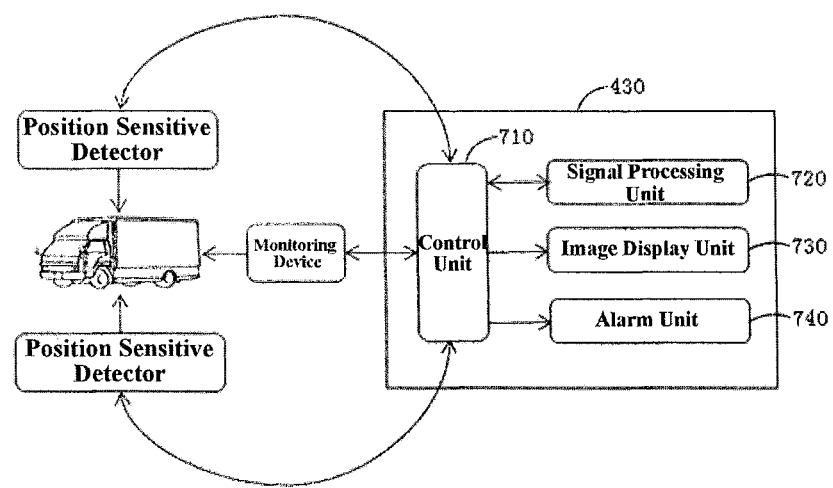
FIG. 7 is a block diagram schematically illustrating a system for inspecting a moving object based on cosmic rays according to an example embodiment of the present disclosure.

FIG. 7 is a block diagram schematically illustrating a system for inspecting a moving object based on cosmic rays according to an example embodiment of the present disclosure.

As shown in FIG. 7, the system includes a main console 430, position sensitive detectors and a monitoring device. The main console 430 further includes a control unit 710, a signal processing unit 720, an image display unit 730 and an alarm unit 740. The main console 430 takes charge of the main control of operation of the entire system for inspecting a moving object, including mechanical control, electrical control, data acquisition, trace matching, image reconstruction, material identification, result display and danger alarm, etc.

Since the inspected vehicle has generally a large volume, enough pixels are required to improve the spatial resolution of the image, and some acceleration methods are required to enhance the imaging speed. Since multiple effective tracks of charged particles are independent to each other, the reconstruction process may be performed in parallel. A multi-core CPU or a multi-thread GPU or other acceleration methods may be used to perform the parallel processes.

According to an exemplary embodiment, the signal processing unit (e.g., a computer) in the system is configured to analyze scattering of the muons and electrons in the channel according to the measured positions and directions of the muons and electrons when entering to the channel and when exiting from the channel, to obtain a scanning image reflecting scattering strength or the radiation length in the channel and a spatial distribution of the scattering density. The acquired scanning image in the channel or the spatial distribution of the scattering density may indicate whether a moving object exits in the channel or not. The drift-tube detectors may be disposed respectively at the top side and the bottom side of the channel. In some embodiments, more drift-tube detectors may be disposed at lateral sides of the channel, to form a box shape or a quadrilateral structure in which a package may enter to be scanned by the system.

In the system, through the signal processing unit, the measurement and processing of the muons and electrons generated by the cosmic rays in the inspected moving object may include: the tracks of the muons and electrons passing through the channel are reconstructed, the momentum of the entering muons and electrons is measured from the signal of the detectors, the momentum of the exiting muons and electrons is measured from the signal of the detectors, and the spatial distribution of the scattering density of the channel is determined. These and other processing results may be used to construct the scanning image and measure various properties of the inspected moving object.

For example, the reconstruction of the tracks of the muons and electrons passing through the detector may include: it is acquired an impact signal representing an identifier of a drift tube hit by a muon and electron and the number of hitting; the identified group of drift tubes in real time is correlated with a track of a particular muon and electron passing through the detector; an initial time when the particular muon and electron hit the drift tube is estimated; based on the estimation of the initial time, data transferred from a drifting time and the hitting time, a drifting radius is determined; an linear track is fitted to a drifting radius corresponding to a particular initial time; an initial time associated with a fitted track best for the particular muon and electron is searched out and selected; and an error between the initial time and the track parameter is calculated. This is reconstruction of a track based on fitting of initial time, to provide reconstruction of a linear track of muons and electrons passing through the detector.

In addition, for example, processing of measuring the momentums of the entering and exiting muons and electrons based on the signals from the detectors may include: for example, a plurality of position sensitive detectors are disposed for scattering the muons and electrons passing through there; the scattering of the muons and electrons in the position sensitive detectors is measured. Measurement of scattering includes measuring the positions of the scattering muons and electrons; at least one track of the muons and electrons is determined from the measured position; and measuring at least one momentum of the muons and electrons from the at least one track. This technology may be used to determine a track of muons and electrons according to the scattering of the muons and electrons from the position sensitive detector and determine the momentum of the muons and electrons.

In addition, for example, the spatial distribution of the scattering density of the moving object may be determined from tomographic scanning data of the muons and electrons through the following steps: acquiring tomographic scanning data of particular muons and electrons with an estimated momentum corresponding to the scattering angle and the muons and electrons passing through the moving object; providing a probability distribution of scattering of the muons and electrons to be used in the MLSD-OSEM algorithm, the probability distribution is based on a statistical multiple scattering model; determining a basic maximum likelihood estimate of the density of the moving object using the MLSD-OSEM algorithm; and outputting a scattering density of the reconstructed moving object. The scattering density of the reconstructed moving object may be used for determining whether an interested moving object exits or not or for recognizing the category of the moving object according to a reconstructed density data.

According to an exemplary embodiment, the system may further include an alarm unit or a warning unit. For example, the console may provide a graphical user interface, on which when there is no suspicious object found through scanning, a "pass" indicator in green is generated for the inspected moving object, and when a suspicious object is found through scanning, an "alarming" indicator in red is generated for the inspected moving object.

In the method, device and system for inspecting a moving object based on cosmic rays of the present disclosure, by combining trajectory tracking technology of moving vehicles and cosmic ray substance identification method, it is possible to inspect the moving vehicles in motion. The objects such as nuclear materials, explosives and drugs inside the moving vehicle can be quickly, safely and effectively inspected with cosmic rays. The inspected vehicle may advance slowly through the channel. A large area of position sensitive detectors is disposed around the channel, to measure the positions and directions of cosmic ray charged particles passing through the vehicle, and obtain a motion track of the ray particles. A monitoring system is also arranged in the channel at a distance interval, to closely track a motion path of the vehicle, and obtain time-position matching information about the moving vehicle. Since the motion track of the particles is related to the property of the object, with a certain imaging algorithm, information about the objects inside the moving vehicle may be obtained. Then, it may be determined whether the vehicle carries with nuclear material, drugs, explosives, and the like. Since the inspection medium is cosmic rays without additional radiation, the system requires no radiation guard. The rays has a strong penetrating power, therefore a underlying detector may be buried in the ground and still can detect and easy to operate. Moreover, the inspected vehicle needs not to be flamed out, and many vehicles can be inspected successively. Therefore, the outdoor operation may be conducted flexibly, and the device may be installed at highways, tunnels, freight stations, ports and other places. Therefore, the present disclosure has very high potential in market application.

FIG. 1 and FIG. 2 schematically illustrate flowcharts of a method for inspecting a moving object based on cosmic rays according to the exemplary embodiments of the present disclosure. The method, for example, may be implemented by using the device and the system for inspecting a moving object based on cosmic rays as illustrated in FIG. 3, FIG. 4, FIG. 5, FIG. 6 or FIG. 7, which is not limited in the present disclosure. It should be noted that, FIG. 1 and FIG. 2 only schematically illustrate, rather than limiting, the steps included in the method according to an exemplary embodiment of the present disclosure. For ease of understanding, the steps as illustrated in FIG. 1 and FIG. 2 do not indicate or limit the time sequence of these steps. In addition, for ease of understanding, these steps may be performed, for example, in a plurality of modules/processes/threads synchronously or asynchronously.

Based on the above description of the embodiments, a person skilled in the art would simply understand that the method and corresponding modules according to the embodiments of the present disclosure may be implemented by means of software or partial hardening of the software. Based on such understandings, the technical solutions according to the embodiments of the present disclosure may be essentially embodied in the form of a software product. The software product may be stored in a non-volatile storage medium such as a CD-ROM, a U disk, a mobile hard disk and the like. The software product includes a number of instructions that enable a computer device (a PC, a server, or a mobile terminal, or a network device and the like) to perform the method provided in the embodiments of the present disclosure.

A person skilled in the art may understand that the accompanying drawings are only intended to schematically illustrate the exemplary embodiments, and the modules or procedures in the drawings are not necessary for the embodiments of the present disclosure, which thus cause no limitation to the protection scope of the present disclosure.

A person skilled in the art would understand that the above modules may be arranged in the apparatus according to the description given in the embodiments, or may be subject to corresponding variations and arranged in one or a plurality of apparatuses different from that in this embodiment. The modules according to the above embodiments may be combined in one module, or split into a plurality of submodules.

Detailed above are exemplary embodiments of the present disclosure. It shall be understood that the present disclosure is not limited to the above exemplary embodiments. On the contrary, the present disclosure is intended to cover various modifications and equivalent deployments within the spirit and scope of the appended claims.

What is claimed is:

1. A method for inspecting a moving object based on cosmic rays, comprising:
    detecting whether a speed of the inspected moving object is within a preset range;
    recording a motion trajectory of the moving object with a monitoring device, the monitoring device comprises combination of any one or more of: a thermal imager, a camera, a pressure sensor, and an optical sensor; and
    acquiring information about charged particles in the cosmic rays with a position sensitive detector, the information about charged particles comprising track information of the charged particles;
    determining the moving object by matching positions of the motion trajectory and the track information;
    reconstructing the track of the charged particles according to the information about the charged particles; and
    recognizing the material inside the moving object based on the track reconstruction, wherein the determining the moving object by matching positions of the motion trajectory and the track information comprises:
    analyzing a time difference between an incident time and an emission time of the track information of the charged particles, wherein the track information of the charged particles comprised in the information about charged particles and information of the moving object are iteratively updated in real time; and
    matching the time and position of the track information of the charged particles and the motion trajectory of the moving object according to an incident position, an emission position of the track information of the charged particles and the analyzed time difference.

2. The method of claim 1, wherein the preset range of the speed of the moving object is selected to ensure that at least one charged particle can be detected from per 100 square centimeters of a surface area of the moving object.

3. The method of claim 1, wherein the position sensitive detector is configured to have a capability of detecting muons and electrons from the cosmic rays;
    the position sensitive detector is configured to have a capability of detecting a material with a medium-to-high atomic number which is higher than the atomic number of aluminum, and a material with a low atomic number which is lower than the atomic number of aluminum, and
    the material with a low atomic number is recognized based on a blocking effect to electrons; and
    the material with a medium-to-high atomic number is recognized based on a scattering effect to muons.

4. The method of claim 1, wherein the position sensitive detector comprises a GEM detector, an MRPC detector, a drift chamber or a drift tube array; and the position sensitive detector is configured as a part of the system for inspecting a moving vehicle, the position sensitive detector is placed in an inspection channel, and a vehicle to be inspected passes through the position sensitive detector.

5. The method of claim 3, wherein reconstructing the track of the charged particles according to the information about the charged particles comprises:
    calculating a parameter Ratio of the material according to the track information of the charged particles, estimating an initial value of an atomic number and an initial value of a relative mass of the material, the parameter Ratio denoting a ratio of a scattering parameter of the material on the charged particles against a blocking parameter of the material on the charged particles;

calculating a radiation length according to a relationship among the initial value of the atomic number and the initial value of the relative mass and the radiation length;

obtaining a thickness of the material according to the radiation length;

calculating a blocking parameter and a scattering parameter of the material according to the initial value of the atomic number, the initial value of the relative mass and the thickness of the material; and recognizing the material with the blocking parameter and the scattering parameter, a material with a low atomic number being recognized based on a blocking effect to electrons in the charged particles; and a material with a medium-to-high atomic number being recognized based on a scattering effect to muons in the charged particles.

6. The method of claim 5, wherein the method further comprises: reconstructing a material distribution map with an imaging algorithm according to a corresponding relationship among the blocking parameter, the scattering parameter and the material property, the imaging algorithm comprising a PoCA algorithm and/or a MLSD-OSEM algorithm.

7. The method of claim 5, wherein the method further comprises: updating information about the material to perform a next iterative process.

8. The method of claim 5, wherein the method further comprises: determining a category characteristic of the material of the moving object according to a corresponding relationship among the scattering parameter, the blocking parameter and the material property, and recognizing the material with a non-parametric test method.

9. The method of claim 1, wherein multiple pieces of track information of the charged particles are processed in parallel during the reconstruction of the track;

the track information of the charged particles comprises an incident time, an incident position and an incident direction, an emission time, an emission position and an emission direction of the charged particles; and determining the moving object by matching positions of the motion trajectory and the track information comprises:

analyzing a time difference between the incident time and the emission time; and matching the time and position of the track information of the charged particles and the motion trajectory of the moving object according to the incident position, the emission position and the analyzed time difference.

10. A device for inspecting a moving object based on cosmic rays, comprising a hardware processor configured to implement:

a speed detection module configured to detect whether a speed of the inspected moving object is within a preset range;

a recording module configured to record a motion trajectory of the inspected moving object with a monitoring device, wherein the monitoring device comprises combination of any one or more of: a thermal imager, a camera, a pressure sensor, and an optical sensor;

an acquiring module configured to acquire information about charged particles in the cosmic rays with a position sensitive detector, the information about charged particles comprising track information of the charged particles, wherein the track information of the charged particles comprised in the information about charged particles and information of the moving object are iteratively updated in real time;

a matching module configured to determine the moving object by matching positions of the motion trajectory and the track information;

a reconstruction module configured to reconstruct the track of the charged particles according to the information about the charged particles; and a recognition module configured to recognize the material inside the moving object based on the track reconstruction, wherein the matching module is further configured to:

analyze a time difference between an incident time and an emission time of the track information of the charged particles; and match the time and position of the track information of the charged particles and the motion trajectory of the moving object according to an incident position, an emission position of the track information of the charged particles and the analyzed time difference.

11. The device of claim 10, wherein the position sensitive detector is configured to have a capability of detecting muons and electrons from the cosmic rays.

12. A system for inspecting a moving object based on cosmic rays, comprising:

a monitoring device configured to track a motion trajectory of the inspected moving object and record a time-position corresponding relationship of the moving object, wherein the monitoring device comprises combination of any one or more of: a thermal imager, a camera, a pressure sensor, and an optical sensor;

a position sensitive detector configured to detect information about charged particles in the cosmic rays, the information about charged particles comprising track information of the charged particles, wherein the track information of the charged particles comprised in the information about charged particles and information of the moving object are iteratively updated in real time;

a console configured to detect whether a speed of the inspected moving object is within a preset range, determine the moving object by matching positions of the motion trajectory and the track information, reconstruct the track of the charged particles according to the information about the charged particles and recognize the material inside the moving object, wherein the console is further configured to:

analyze a time difference between an incident time and an emission time of the track information of the charged particles; and match the time and position of the track information of the charged particles and the motion trajectory of the moving object according to an incident position, an emission position of the track information of the charged particles and the analyzed time difference.

13. The system of claim 12, wherein the preset range of the speed of the moving object is selected to ensure that at least one charged particle can be detected from per 100 square centimeters of a surface area of the moving object.

14. The system of claim 12, wherein the position sensitive detector is configured to have a capability of detecting muons and electrons from the cosmic rays; and the position sensitive detector is configured to have a capability of detecting a material with a medium-to-high atomic number which is higher than the atomic number of aluminum, and a material with a low atomic number which is lower than the atomic number of aluminum, and the material with a low atomic number is recognized based on a blocking effect to electrons; and the material with a medium-to-high atomic number is recognized based on a scattering effect to muons.

15. The system of claim 12, wherein the position sensitive detector is configured as a part of the system for inspecting a moving vehicle, the position sensitive detector is placed in an inspection channel, and a moving vehicle to be inspected passes through the position sensitive detector; and the position sensitive detector comprises:

a first group of position sensitive detectors, disposed at a first side of the inspection channel, and configured to measure positions and directions of the incident charged particles entering the inspection channel; and a second group of position sensitive detectors, disposed at a second side of the inspection channel, which is opposite to the first side, and configured to measure positions and directions of the emission charged particles exiting from the inspection channel.

16. The system of claim 15, wherein the position sensitive detector further comprises:

a third group of position sensitive detectors, disposed at a third lateral side different from the first side and the second side of the inspection channel, and configured to measure positions and directions of the emission charged particles exiting from the inspection channel; and/or a fourth group of position sensitive detectors, disposed at a fourth lateral side different from the first side, the second side and the third side of the inspection channel, and configured to measure positions and directions of the emission charged particles exiting from the inspection channel.

17. The system of claim 16, wherein an angle between the third group of position sensitive detectors and/or the fourth group of position sensitive detectors, and the second group of position sensitive detectors is greater than or equal to 90 degrees and less than 180 degrees.

18. The system of claim 12, wherein the position sensitive detector comprises a GEM detector, an MRPC detector, a drift chamber or a drift tube array;

the drift tube array is composed of a plurality of aluminum drift tubes forming a structure of a plurality of super-layers, each super-layer at least comprises a first planar aluminum drift tube in a first direction and a second planar drift tube in a second direction different from the first direction; and the first planar aluminum drift tube and the second planar aluminum drift tube each comprises two rows of aluminum drift tubes in parallel to each other.

19. The system of claim 16, wherein the console comprises: a signal processing unit, configured to receive a measurement signal of incident charged particles from the first group of position sensitive detectors and measurement signals of emission charged particles from the second group of position sensitive detectors and/or the third group of position sensitive detectors and/or the fourth group of position sensitive detectors, the signal processing unit is configured to analyze scattering of the charged particles passing through the material in the inspection channel, to acquire a spatial distribution of a scattering center in the inspection channel or reconstruction of the track of the charged particles, according to the measured incident positions and directions, emission positions and directions of the charged particles.

20. The system of claim 12, wherein the monitoring device further comprises a depth camera.

* * * * *